(12) United States Patent
Birch et al.

(10) Patent No.: US 12,177,232 B2
(45) Date of Patent: Dec. 24, 2024

(54) SYSTEM AND METHOD FOR NETWORK ADDRESS ANOMALY DETECTION USING MACHINE LEARNING

(71) Applicant: BANK OF AMERICA CORPORATION, Charlotte, NC (US)

(72) Inventors: Christopher Daniel Birch, Tega Cay, SC (US); Jennie Kathleen Egbert, Parker, CO (US); Jeffrey Wayne Texada, Carrollton, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 303 days.

(21) Appl. No.: 17/713,897

(22) Filed: Apr. 5, 2022

(65) Prior Publication Data

US 2023/0319069 A1    Oct. 5, 2023

(51) Int. Cl.
*H04L 9/40* (2022.01)
*G06N 20/00* (2019.01)
*H04L 61/4511* (2022.01)

(52) U.S. Cl.
CPC ......... *H04L 63/1416* (2013.01); *G06N 20/00* (2019.01); *H04L 61/4511* (2022.05); *H04L 63/1425* (2013.01); *H04L 63/1466* (2013.01)

(58) Field of Classification Search
CPC ............ H04L 63/1416; H04L 63/1425; H04L 63/1466; H04L 61/4511; G06N 20/00
See application file for complete search history.

(56) References Cited

U.S. PATENT DOCUMENTS

| | | | |
|---|---|---|---|
| 7,191,210 B2 | 3/2007 | Grossman | |
| 7,457,823 B2 | 11/2008 | Shraim et al. | |
| 7,912,897 B2 | 3/2011 | Grossman | |
| 8,260,914 B1 * | 9/2012 | Ranjan | H04L 63/12 709/224 |
| 8,307,431 B2 | 11/2012 | Krishnamurthy et al. | |
| 8,510,411 B2 | 8/2013 | Coulson et al. | |
| 8,549,623 B1 | 10/2013 | Cooley | |
| 8,578,481 B2 | 11/2013 | Rowley | |
| 8,707,426 B1 | 4/2014 | Ramzan et al. | |

(Continued)

*Primary Examiner* — Carl G Colin
*Assistant Examiner* — Andrew Suh
(74) *Attorney, Agent, or Firm* — Moore & Van Allen PLLC; Gabrielle M. Carlini (57) ABSTRACT

Embodiments of the invention are directed to systems, methods, and computer program products for utilizing machine learning to predict future deceitful domain names and determine preferred security responses. As such, the system allows for use of a machine learning engine to collect new domain name registration information from a plurality of sources and predict future name registrations associated with said sources. A single user may register deceitful domain names through a plurality of domain name registration systems. By collecting data from multiple servers, the system may identify data trends and generate predictions of future domain names independently of any individual server. Thus, the system may benefit a number of entities, by providing real-time data analysis that would not be obtainable by any one entity operating alone. Additionally, the system may provide a single managing entity with real-time suggestions that may decrease the likelihood of a security incident involving a particular domain name.

20 Claims, 4 Drawing Sheets

(56) References Cited

U.S. PATENT DOCUMENTS

| | | |
|---|---|---|
| 8,869,269 B1 | 10/2014 | Ramzan et al. |
| 9,178,888 B2 | 11/2015 | Thayer et al. |
| 9,497,216 B2 | 11/2016 | Khanna et al. |
| 9,521,138 B2 | 12/2016 | Thayer et al. |
| 9,558,497 B2 | 1/2017 | Carvalho |
| 9,769,153 B1 | 9/2017 | Bowen |
| 9,838,407 B1 | 12/2017 | Oprea et al. |
| 9,894,041 B2 * | 2/2018 | Norum ................ H04L 63/0428 |
| 11,399,035 B1 * | 7/2022 | Batchu ................ H04L 63/1483 |
| 2006/0095586 A1 | 5/2006 | Adelman et al. |
| 2007/0208869 A1 | 9/2007 | Adelman et al. |
| 2010/0313253 A1 | 12/2010 | Reiss |
| 2013/0318603 A1 * | 11/2013 | Merza ................ H04L 61/4511 |
| | | 726/22 |
| 2019/0238576 A1 * | 8/2019 | Weber ................ H04L 63/1425 |
| 2020/0020059 A1 | 1/2020 | Cardinal et al. |
| 2021/0377303 A1 * | 12/2021 | Bui ........................ G06F 40/14 |
| 2023/0006956 A1 * | 1/2023 | Hamilton ............. H04L 51/212 |

* cited by examiner

SYSTEM AND METHOD FOR NETWORK ADDRESS ANOMALY DETECTION USING MACHINE LEARNING

BACKGROUND

In computer networking, domain names are typically used to identify and access Internet Protocol (IP) addresses associated with each name. This is achieved using a Domain Name System (DNS) server, which may translate between domain names and associated IP addresses by querying a locally stored dataset or other DNS servers. Because new domain names can be registered relatively easily and anonymously, deceitful domain names are often used in malicious network attacks. As these malicious operations evolve in complexity, Internet service providers (ISPs), as well as other entities utilizing information technology resources, must continuously improve their security measures in response.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention relate to systems, methods, and computer program products for network anomaly detection, the invention including: querying a data packet from a DNS server, wherein the data packet comprises data associated with a domain name, wherein the domain name was registered by a user; determining, from the data packet, a set of standard characteristics of the domain name; querying a data repository for one or more datasets matching the set of standard characteristics and append the data packet to the one or more datasets matching the set of standard characteristics, creating a combined dataset; processing the combined dataset via a first machine learning engine to predict one or more future domain names; and transmitting a notification to one or more managing entity systems, wherein the notification comprises information associated with the one or more predicted future domain names.

In some embodiments, the invention further includes determining, from the data packet, a set of standard characteristics of the domain further includes converting the data associated with the domain name into one or more of a top-level domain string, a second-level domain string, and an additional layer domain string.

In some embodiments, the invention further includes determining, from the data packet, a set of standard characteristics of the domain name further comprises assigning the data associated with the domain to one or more predetermined categories based on a calculated similarity score.

In some embodiments, the invention further includes, when processing the combined dataset via the first machine learning engine, generating a machine learning dataset, wherein the machine learning dataset comprises data identifying one or more patterns or sequences of a plurality of domain names registered by the user.

In some embodiments, the invention further includes receiving a plurality of security incident datasets from the one or more managing entity systems, wherein each security incident dataset comprises data associated with a security incident involving a domain name.

In some embodiments, the invention further includes processing the plurality of security incident datasets via a second machine learning engine to predict one or more future security incidents involving a domain name.

In some embodiments, the invention further includes, when processing the plurality of security incident datasets via a second machine learning engine to predict one or more future security incidents involving a domain name, determining a plurality of responses which will decrease a likelihood of occurrence of the one or more future security incidents.

In some embodiments, the invention further includes causing the one or more managing entity systems to execute the plurality of responses.

more third party managing entities.

In some embodiments, processing the combined dataset via the machine learning engine to predict one or more future resource transfers further includes determining a plurality of adjustments which will result in the predicted associated entity to be the managing entity system for at least one of the one or more future resource transfers.

In some embodiments, the invention further includes causing the managing entity system to execute the plurality of adjustments.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like which employs information technology resources and particularly technology infrastructure configured for managing one or more computing systems. The computing systems may comprise applications relating to one or more operations of the entity. As such, the entity or managing entity may be any institution, group, association, establishment, authority, or the like, employing information technology resources for managing system-wide applications.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications. "Application" as used herein may refer to any computer or software program which may serve one or more purposes relating to the entity, such as execution of products or services, data analysis and management, information security, internal and/or external communications, and/or any other function performed by the entity.

"Requesting entity" as used herein may refer to an individual or entity associated with registration or creation of domain names. In some instances, a "requesting entity" is an individual or group who has a relationship with the managing entity, such as an employee, administrator, or the like. Accordingly, as used herein the term "user device" or "mobile device" may refer to mobile phones, personal computing devices, tablet computers, wearable devices, and/or any portable electronic device capable of receiving and/or storing data therein and are owned, operated, or managed by a requesting entity.

A domain name system (DNS) server as defined herein may refer to any naming system used to identify the location of a file, record, computing device, or the like on a private or public network. A DNS server may contain data associating domain names with unique IP addresses. In some embodiments, the DNS server may locally store said data. Additionally or alternatively, the DNS server may comprise a plurality of DNS servers in operative communication via a private or public network, wherein each DNS server may query data from and respond to queries from other DNS severs on the network.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to teach other with one or more components located between the components that are operatively coupled together. Furthermore, "operatively coupled" may mean that the components are detachable from each other, or that they are permanently coupled together. Furthermore, "operatively coupled" may mean that components may be electronically connected.

The system allows for use of a machine learning engine to collect domain name information from a plurality of sources and predict a security score associated with said domain names. Because many requesting entities do not require payment for one to two months, users often take advantage of this opportunity by anonymously registering deceitful domain names, then abandoning the domain name when payment is due. By collecting data associated with each newly registered domain name, the system may identify data trends and generate predictions of future deceitful domain names independently of the managing entity which a user may be impersonating. In this way, the system may benefit a number of managing entities, by providing real-time insights and data analysis that would not be obtainable by any one entity operating alone. Additionally, the features and functions of the system may provide a managing entity with real-time suggestions of actions that may prevent a user from successfully impersonating the managing entity using a deceitful domain name.

Figure 1:
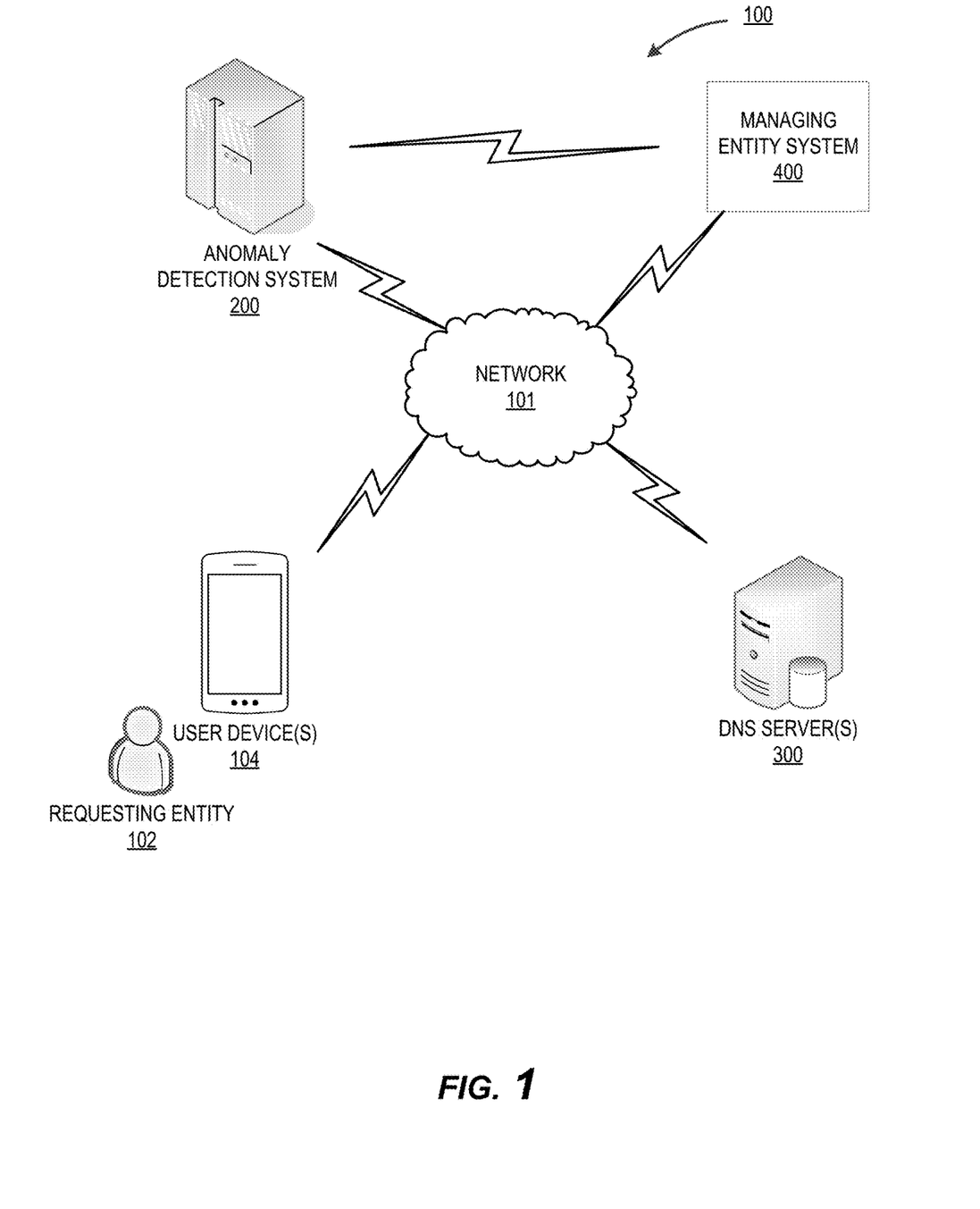
FIG. 1 illustrates an operating environment for the anomaly detection system, in accordance with one embodiment of the present disclosure.

FIG. 1 illustrates an operating environment 100 for the anomaly detection system, in accordance with one embodiment of the present disclosure. As illustrated, the operating environment 100 may comprise a managing entity system 400 and one or more DNS server(s) 300 in operative communication with one or more user device(s) 104 associated with one or more user(s) 102. The operative communication may occur via a network 101 as depicted. The operating environment also includes an anomaly detection system 200 and/or other systems/devices not illustrated herein and connected via a network 101. As such, the user 102 may register a domain name with the DNS server(s) 300 by establishing operative communication channels between the user device 104 and DNS server(s) 300 via a wireless network 101. In other embodiments, the user may register a domain name with the DNS server(s) 300 by interfacing directly with the server.

Typically, the anomaly detection system 200 may be in operative communication with the managing entity system 400 and DNS server(s) 300, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the DNS server(s)). In this regard, the wireless communication channel may further comprise near field communication (NFC), communication via radio waves, communication through the internet, communication via electromagnetic waves and the like.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, laptop computers, cameras, video recorders, audio/video player, radio, GPS devices, any combination of the aforementioned, or the like.

The managing entity system 400 may comprise a communication module and memory not illustrated and may be configured to establish operative communication channels with the anomaly detection system 200 via a network 101. The managing entity may comprise a domain name data repository which stores domain name data. This data may be used by the anomaly detection system to evaluate the similarity between a new domain name and a domain name registered by the managing entity. In some embodiments, the managing entity system is in operative communication with the anomaly detection system 200 via a private communication channel. The private communication channel may be via a network 101 or the anomaly detection system 200 may be fully integrated within the managing entity system 400.

As will be discussed in greater detail in FIG. 3 and FIG. 4, the managing entity system 400 and the DNS server(s) 300 may communicate with the anomaly detection system 200 in order to transmit data associated with domain names registered by a plurality of users 102. In some embodiments, the managing entity may utilize the features and functions of the anomaly detection system to predict user behavior and anticipate future deceitful domain names. In other embodiments, the managing entity may utilize the anomaly detection system to react to identified trends in domain name registrations.

Figure 2:
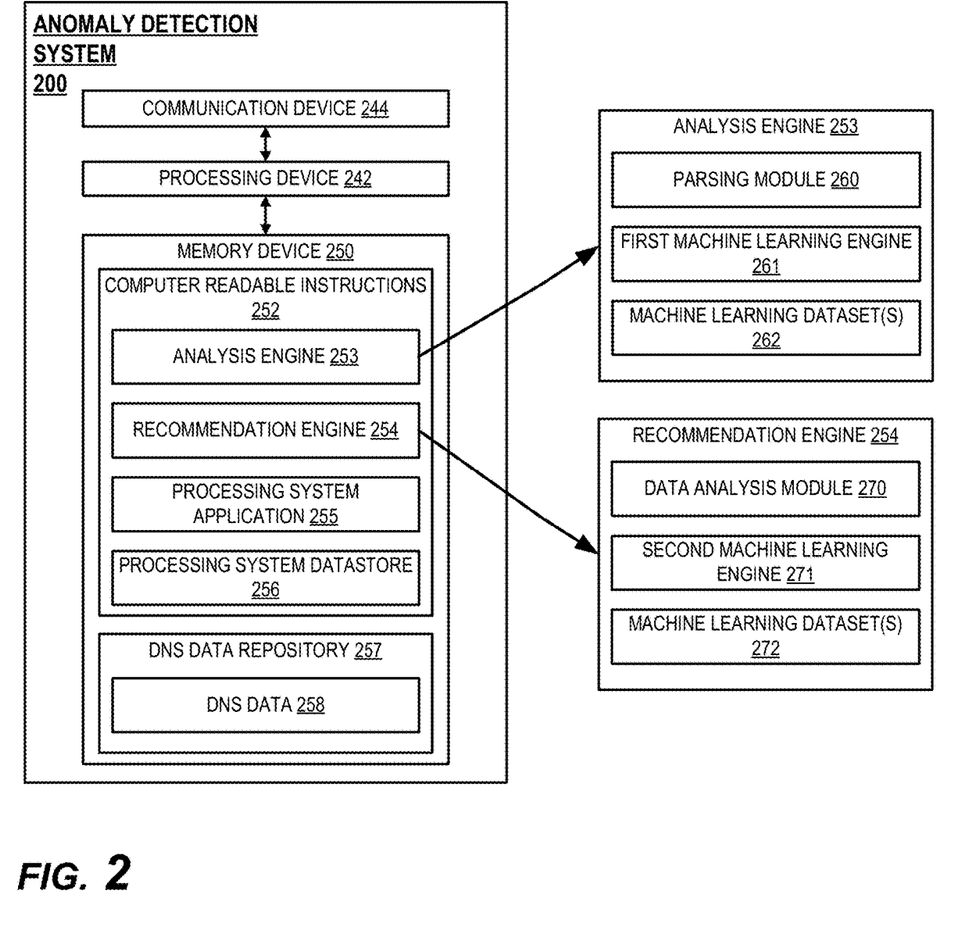
FIG. 2 is a block diagram illustrating the anomaly detection system.

FIG. 2 illustrates a block diagram of the anomaly detection system 200 associated with the operating environment 100, in accordance with embodiments of the present invention. As illustrated in FIG. 2, the anomaly detection system 200 may include a communication device 244, a processing device 242, and a memory device 250 having an analysis engine 253, a recommendation engine 254, a processing system application 255 and a processing system datastore 256 stored therein. As shown, the processing device 242 is operatively connected to and is configured to control and cause the communication device 244, and the memory device 250 to perform one or more functions. In some embodiments, the analysis engine 253, the recommendation engine 254, and/or the processing system application 255 comprises computer readable instructions that when executed by the processing device 242 cause the processing device 242 to perform one or more functions and/or transmit control instructions to the DNS server(s) 300, the managing entity system 400, and/or the communication device 244. It will be understood that the analysis engine 253, the recommendation engine 254, and/or the processing system application 255 may be executable to initiate, perform, complete, and/or facilitate one or more portions of any embodiments described and/or contemplated herein. The analysis engine 253 may comprise executable instructions associated with data processing and analysis related to registered domain names and may be embodied within the processing system application 255 in some instances. The recommendation engine 254 may comprise executable instructions associated with data processing and analysis related to various managing entity actions and may be embodied within the processing system application 255 in some instances. The anomaly detection system 200 may be owned by, operated by, and/or affiliated with the same managing entity that owns or operates the managing entity system 500. In some embodiments, the anomaly detection system 200 is fully integrated within the managing entity system 500.

The analysis engine 253 may further comprise a parsing module 260, a first machine learning engine 261, and a first machine learning dataset(s) 262. The parsing module 260 may store instructions and/or data that may cause or enable the anomaly detection system 200 to receive, store, and/or analyze data received by the managing entity system 400 and the DNS server(s) 300. The parsing module may process data to identify domain name characteristics as is discussed in greater detail with respect to FIG. 3. The first machine learning engine 261 and first machine learning dataset(s) 262 may store instructions and/or data that cause or enable the anomaly detection system 200 to determine, in real-time and based on received information, trends in deceitful domain name registration. The first machine learning dataset(s) 262 may contain DNS data 258 queried from a DNS data repository 257 and/or may be based on historical data relating to a particular user, DNS server, managing entity, past domain name characteristics, and/or the like. In some embodiments, the first machine learning dataset(s) 262 may also contain data relating to user activity other than domain name registration as is further described herein.

The first machine learning engine 261 may receive data from a plurality of sources and, using one or more machine learning algorithms, may generate one or more first machine learning datasets 262. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

The first machine learning datasets 262 may include machine learning data linking two or more details of a domain name (e.g. the time that the domain name was registered, a location at which the domain name was registered, information relating to the user (e.g. name, other associated domain names, etc.), and/or the like) to identify one or more patterns or sequences of new domain names that may aid in predicting one or more future registrations by the same user or by another user with a similar registration history. For instance, the first machine learning datasets 262 may include data linking a series of historical non-deceitful domain name registrations at particular dates/times with a likelihood of a user registering a similar, deceitful domain name at a predicted future date/time. Thus, this data may enable the anomaly detection system 200 to predict a likely future deceitful domain name registration. The data associated with a domain name may be supplemented by additional data obtained from an interaction between the user device 104 and the DNS server(s) 300. For example, in some embodiments, the system may determine, based on data obtained from a user device 104, that a user is associated with a particular managing entity. The anomaly detection system 200 may weight that information accordingly in determining whether the registered domain name is likely to be deceitful. Additionally or alternatively, the system may determine, based on a top-level domain of a domain name (e.g. ".edu", ".gov"), whether a user is likely to register additional domain names using the same top-level domain.

The recommendation engine 254 may further comprise a data analysis module 270, a second machine learning engine 271, and second machine learning dataset(s) 272. The data analysis module 270 may store instructions and/or data that may cause or enable the anomaly detection system 200 to receive, store, and/or analyze data received by the managing entity system 400 and the DNS server(s) 300. The data analysis module 270 may process data to calculate an action success score as is discussed in greater detail with respect to FIG. 4. The second machine learning engine 271 and second machine learning dataset(s) 272 may store instructions and/or data that cause or enable the anomaly detection system 200 to determine, in real-time and based on received information, the success rates of various security measures executed by the managing entity system 400. The second machine learning dataset(s) 272 may contain DNS data 258 queried from a DNS data repository 257, action data queried from the managing entity system 400, and/or may be based on historical data relating to a particular DNS server, managing entity, past domain name characteristics, and/or the like. In some embodiments, the second machine learning dataset(s) 272 may also contain data relating to managing entity activity other than security measures as is further described herein.

The second machine learning engine 271 may receive data from a plurality of sources and, using one or more machine learning algorithms, may generate one or more second machine learning dataset(s) 272. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

The second machine learning dataset(s) 272 may include machine learning data linking one or more details of a domain name (e.g. the time that the domain name was registered, a location at which the domain name was registered, information relating to the user (e.g. name, other associated domain names, etc.), and/or the like) with one or more details of a managing entity action to identify one or more patterns or sequences of security measures that may be successful in managing deceitful domain names. For instance, the second machine learning dataset(s) 272 may include data linking a series of historical security measures for particular domain names with a success likelihood of a similar, future security measure against a predicted future domain name. Thus, this data may enable the anomaly detection system 200 to predict which security measures are most likely to be successful against a domain name predicted by the first machine learning engine 260.

The communication device 244 may generally include a modem, server, transceiver, and/or other devices for communicating with other devices on the network 101. The communication device 244 may be a communication interface having one or more communication devices configured to communicate with one or more other devices on the network 101, such as the anomaly detection system 200, the DNS server(s) 300, other processing systems, data systems, etc.

Additionally, referring to the anomaly detection system 200 illustrated in FIG. 2, the processing device 242 may generally refer to a device or combination of devices having circuitry used for implementing the communication and/or logic functions of the transfer volume control system 200. For example, the processing device 242 may include a control unit, a digital signal processor device, a microprocessor device, and various analog-to-digital converters, digital-to-analog converters, and other support circuits and/or combinations of the foregoing. Control and signal processing functions of the anomaly detection system 200 may be allocated between these processing devices according to their respective capabilities. The processing device 242 may further include functionality to operate one or more software programs based on computer-executable program code 252 thereof, which may be stored in a memory device 250, such as the processing system application 254, the analysis engine 253, and the recommendation engine 254. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 242 may be configured to use the network communication interface of the communication device 244 to transmit and/or receive data and/or commands to and/or from the other devices/systems connected to the network 101.

The memory device 250 within the anomaly detection system 200 may generally refer to a device or combination of devices that store one or more forms of computer-readable media for storing data and/or computer-executable program code/instructions. For example, the memory device 250 may include any computer memory that provides an actual or virtual space to temporarily or permanently store data and/or commands provided to the processing device 242 when it carries out its functions described herein.

In some instances, various features and functions of the invention are described herein with respect to a "system." In some instances, the system may refer to the anomaly detection system 200 performing one or more steps described herein in conjunction with other devices and systems, either automatically based on executing computer readable instructions of the memory device 250, or in response to receiving control instructions from the managing entity system 400. In some instances, the system refers to the devices and systems on the operating environment 100 of FIG. 1. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

Figure 3:
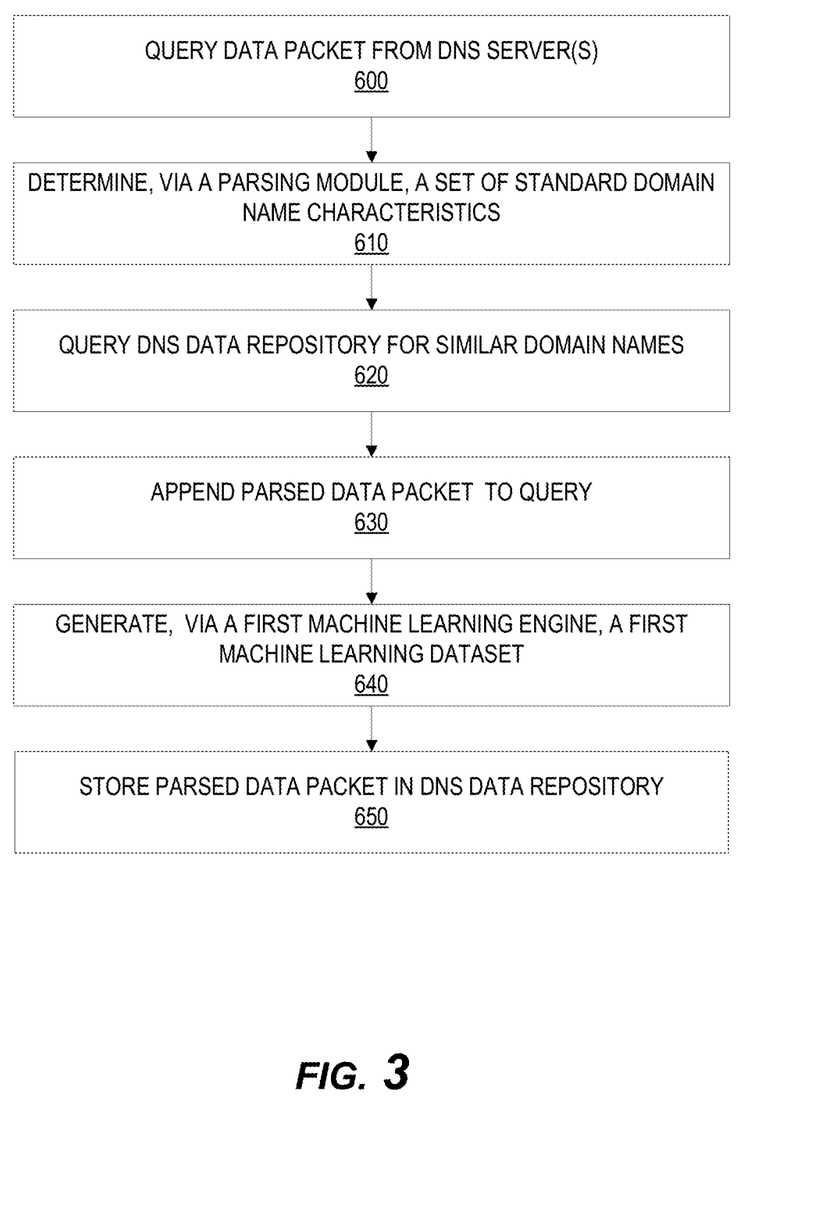
FIG. 3 is a flow diagram illustrating a process using the anomaly detection system, in accordance with one embodiment of the present disclosure.

FIG. 3 is a high-level process flow diagram illustrating a process using the anomaly detection system 200, in accordance with one embodiment of the present disclosure. The process begins at block 600, where the system queries a data packet from a DNS server 300, wherein the data packet contains information characterizing one or more recently registered domain names. In some embodiments, information characterizing a domain name may include a top-level domain name such as ".com", ".org", ".edu" or the like. Additionally or alternatively, datasets may include a second-level domain name comprising a text string to the left of the top-level domain name, such as "entity" or "abc". In some embodiments, datasets may further include one or more additional level domains separated from the second-level domain by a "." such as "accounts.entity" or "us.entity." The information contained with the data packet may also include but is not limited to data such as a timestamp, information identifying the user that registered the domain name, information identifying the user device that the domain name was registered from, and/or the like. In some embodiments the system may automatically receive a data packet after each registration of an individual domain name, or in other embodiments the system may choose to query an aggregated data packet after a predetermined amount of time, such as once per hour. In some embodiments, the system may simultaneously receive data from a plurality of DNS servers. Additionally or alternatively, the system may receive domain name information directly from one or more user device(s) 104.

The process may then continue to block 610, wherein for each individual domain name, the system parses a set of standard characteristics from the information associated with the domain name (e.g., via the parsing module 260). Standard characteristics may include any type of information included in a received data packet and may be normalized, via the parsing module, depending on the specific formatting used by each DNS server that transmits data. For example, in some embodiments, a DNS server may include in each data packet a full domain name containing a second-level domain and a top-level domain. A second DNS may include in each data packet a second-level domain and a top-level domain as separate data entries. Thus, the parsing module 260 may convert the domain name string from the first DNS server into an individual second-level domain string and a top-level domain string. In some embodiments, standard characteristics such as domain name category (e.g. unique, emulating a known entity, random string, etc.) may be assigned based on a calculated similarity score to one of a plurality of predetermined categories.

The process may then continue to block 620, wherein the system may query the DNS data repository 257 for datasets of domain names with similar standard characteristics as the newly received domain name information. In some embodiments, the system may query for a larger selection of domain names, such as all domain names registered by the same user, within a particular date range, or the like. The system may then append the DNS data repository dataset to the queried data 630 and process the combined data via the first machine learning engine 261.

In block 640 of FIG. 3, the output of the first machine learning engine is a newly generated first machine learning dataset 262. As previously described, the newly generated first machine learning dataset may be used to link two or more details of a domain name (e.g. the time that the domain name was registered, a location at which the domain name was registered, information relating to the user (e.g. name, other associated domain names, etc.), and/or the like) together. This data may enable the system to identify one or more patterns or sequences of new domain names that may aid in predicting one or more future registrations by the same user or by another user with a similar registration history. In block 650 of FIG. 3, the system may store the parsed data packet in the DNS data repository 257. In some embodiments, the system may transmit this data to one or more managing entity systems in the form of a regularly generated report. Additionally, or alternatively, the system may transmit this report in response to a query from a managing entity.

Figure 4:
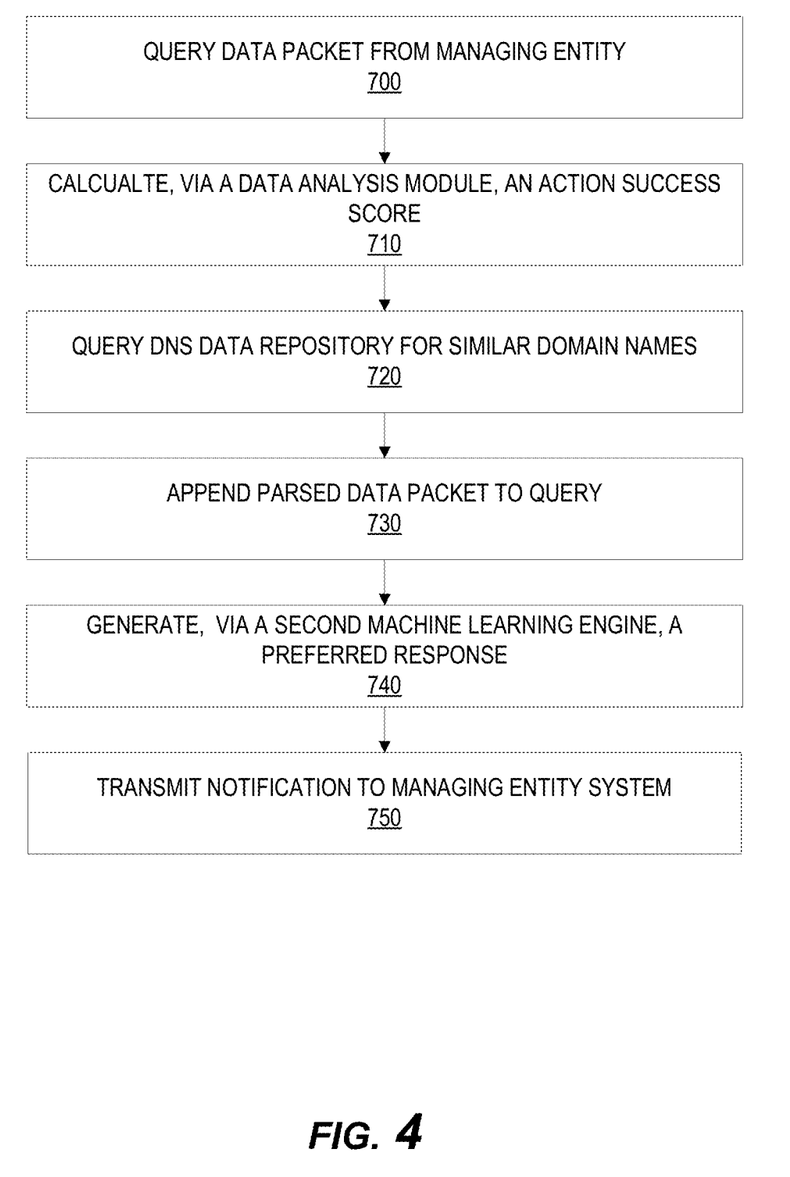
FIG. 4 is a flow diagram illustrating a process using the anomaly detection system, in accordance with another embodiment of the present disclosure.

FIG. 4 is a high-level process flow diagram illustrating a process using the anomaly detection system, in accordance with another embodiment of the present disclosure. The process begins at block 700, wherein the system queries, from the managing entity system, a data packet, wherein the data packet contains information characterizing one or more recent network security incidents. In some embodiments, information characterizing a network security incident may include information characterizing a relevant user or user device, information characterizing the incident type (e.g., deceitful domain name used, text of a deceitful email or other message, timestamp of the incident, and/or the like), and/or information relating to incident resolution (e.g. time to discovery of the incident, security measures taken, type of information compromised in the incident, and/or the like). In some embodiments the system may automatically receive a data packet after each network security incident, or in other embodiments the system may choose to query an aggregated data packet after a predetermined amount of time, such as once per day. In some embodiments, the system may simultaneously receive data from a plurality of managing entity systems.

In block 710, the system may then use the data analysis module 270 to calculate an action success score of each network security incident. Calculation of the action success score may factor in the number and types of devices affected, the nature of the compromised information, the managing entity's reaction time, the computational power required to execute the security measure, and/or the like.

The process may then continue to block 720, wherein the system may query the DNS data repository 257 for datasets of domain names with similar standard characteristics as the domain name(s) used in each network security incident. In some embodiments, the system may query for a larger selection of domain names, such as all domain names involved in similar incident types, within a particular date range, or the like. The system may then append the DNS data repository dataset to the queried data as shown in block 730 and process the combined data via the second machine learning engine 271.

Next, the system may generate 740, via the second machine learning engine, a preferred managing entity response for each domain name in the DNS data repository. For example, the system may first predict that if a domain name was created within 7 days, then there is a 50% greater likelihood of the domain name being used in a network security incident. Then, the system may predict that if the managing entity system added a security notification to all emails sent from that domain, then the number of network security incidents using that domain name would decrease by some percentage. In another example, the system may determine that a domain name with less than a 3 character difference from a managing entity's domain name has a certain likelihood of being used in a network security incident. Then, the system may predict that if the managing entity system added that domain name to a list of banned domains, then the number of network security incidents using that domain name would decrease by some percentage.

The process continues in block 750, wherein the system may generate a notification or data packet containing details of the predicted security incidents, as well as the list of preferred responses determined in block 740. The message may contain information such as predicted times and/or dates of the security incidents, information identifying the likely users or devices to be targeted, information identifying the domain names, and/or information identifying a plurality of preferred responses. Then, the system transmits that notification to the managing entity system. Additionally or alternatively, in embodiments wherein the system is fully integrated into the managing entity system, the system may automatically cause the managing entity system to execute the list of preferred responses, allowing the network security incidents to be remediated in real time.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for network anomaly detection, the system comprising:
   at least one non-transitory storage device; and
   at least one processing device coupled to the at least one non-transitory storage device, wherein the at least one processing device is configured to:
      query a data packet from a domain name system ("DNS") server, wherein the data packet comprises data associated with a domain name, wherein the domain name was registered by a user;
      determine, from the data packet, a set of standard characteristics of the domain name;
      query a data repository for one or more datasets matching the set of standard characteristics of the domain name registered within a predetermined date range, and append the data packet to the one or more datasets matching the set of standard characteristics of the domain name registered within a predetermined date range, creating a combined dataset;
      process the combined dataset via a first machine learning engine to predict one or more future domain names; and
      transmit a notification to one or more managing entity systems, wherein the notification comprises information associated with the one or more predicted future domain names.

2. The system of claim 1, wherein determining, from the data packet, the set of standard characteristics of the domain name comprises converting the data associated with the domain name into one or more of a top-level domain string, a second-level domain string, and an additional layer domain string.

3. The system of claim 2, wherein determining, from the data packet, the set of standard characteristics of the domain name further comprises assigning the data associated with the domain to one or more predetermined categories based on a calculated similarity score.

4. The system of claim 1, wherein the at least one processing device is further configured to, when processing the combined dataset via the first machine learning engine, generate a machine learning dataset, wherein the machine learning dataset comprises data identifying one or more patterns or sequences of a plurality of domain names registered by the user.

5. The system of claim 1, wherein the at least one processing device is further configured to receive a plurality of security incident datasets from the one or more managing entity systems, wherein each security incident dataset comprises data associated with a security incident involving a domain name.

6. The system of claim 5, wherein the at least one processing device is further configured to process the plurality of security incident datasets via a second machine learning engine to predict one or more future security incidents involving a domain name.

7. The system of claim 6, wherein processing the plurality of security incident datasets via the second machine learning engine to predict one or more future security incidents involving the domain name further comprises determining a plurality of responses which will decrease a likelihood of occurrence of the one or more future security incidents.

8. The system of claim 7, wherein the at least one processing device is further configured to cause the one or more managing entity systems to execute the plurality of responses.

9. A computer program product for network anomaly detection, the computer program product comprising at least one non-transitory computer-readable medium having computer-readable program code portions embodied therein, the computer-readable program code portions comprising:
   an executable portion configured for querying a data packet from a domain name system ("DNS") server, wherein the data packet comprises data associated with a domain name, wherein the domain name was registered by a user;
   an executable portion configured for determining, from the data packet, a set of standard characteristics of the domain name;
   an executable portion configured for querying a data repository for one or more datasets matching the set of standard characteristics of the domain name registered within a predetermined date range, and append the data packet to the one or more datasets matching the set of standard characteristics of the domain name registered within a predetermined date range, creating a combined dataset;
   an executable portion configured for processing the combined dataset via a first machine learning engine to predict one or more future domain names; and
   an executable portion configured for transmitting a notification to one or more managing entity systems, wherein the notification comprises information associated with the one or more predicted future domain names.

10. The computer program product of claim 9, wherein determining, from the data packet, the set of standard characteristics of the domain name comprises converting the data associated with the domain name into one or more of a top-level domain string, a second-level domain string, and an additional layer domain string.

11. The computer program product of claim 10, wherein determining, from the data packet, the set of standard characteristics of the domain name further comprises assigning the data associated with the domain to one or more predetermined categories based on a calculated similarity score.

12. The computer program product of claim 9, further comprising an executable portion configured for, when processing the combined dataset via the first machine learning engine, generating a machine learning dataset, wherein the machine learning dataset comprises data identifying one or more patterns or sequences of a plurality of domain names registered by the user.

13. The computer program product of claim 9, further comprising an executable portion configured for receiving a plurality of security incident datasets from the one or more managing entity systems, wherein each security incident dataset comprises data associated with a security incident involving a domain name.

14. The computer program product of claim 13, further comprising an executable portion configured for processing the plurality of security incident datasets via a second machine learning engine to predict one or more future security incidents involving a domain name.

15. The computer program product of claim 14, wherein processing the plurality of security incident datasets via the second machine learning engine to predict one or more future security incidents involving the domain name further comprises determining a plurality of responses which will decrease a likelihood of occurrence of the one or more future security incidents.

16. The computer program product of claim 15, further comprising an executable portion configured for causing the one or more managing entity systems to execute the plurality of responses.

17. A computer-implemented method for network anomaly detection, the method comprising:
providing a computing system comprising a computer processing device and a non-transitory computer readable medium, wherein the computer readable medium comprises configured computer program instruction code, such that when said instruction code is operated by said computer processing device, said computer processing device performs the following operations:
querying a data packet from a domain name system ("DNS") server, wherein the data packet comprises data associated with a domain name, wherein the domain name was registered by a user;
determining, from the data packet, a set of standard characteristics of the domain name;
querying a data repository for one or more datasets matching the set of standard characteristics of the domain name registered within a predetermined date range, and append the data packet to the one or more datasets matching the set of standard characteristics of the domain name registered within a predetermined date range, creating a combined dataset;
processing the combined dataset via a first machine learning engine to predict one or more future domain names; and
transmitting a notification to one or more managing entity systems, wherein the notification comprises information associated with the one or more predicted future domain names.

18. The computer-implemented method of claim 17, wherein determining, from the data packet, the set of standard characteristics of the domain name comprises:
converting the data associated with the domain name into one or more of a top-level domain string, a second-level domain string, and an additional layer domain string; and
assigning the data associated with the domain to one or more predetermined categories based on a calculated similarity score.

19. The computer-implemented method of claim 17, further comprising: when processing the combined dataset via the first machine learning engine, generating a machine learning dataset, wherein the machine learning dataset comprises data identifying one or more patterns or sequences of a plurality of domain names registered by the user.

20. The computer-implemented method of claim 17, further comprising:
receiving a plurality of security incident datasets from the one or more managing entity systems, wherein each security incident dataset comprises data associated with a security incident involving a domain name;
processing the plurality of security incident datasets via a second machine learning engine to predict one or more future security incidents involving a domain name; and
determining, via the second machine learning, a plurality of responses which will decrease a likelihood of occurrence of the one or more future security incidents.

* * * * *